United States Patent [19]

Bergius et al.

[11] Patent Number: 4,669,566
[45] Date of Patent: Jun. 2, 1987

[54] MEANS FOR IMPROVING THE STABILITY OF A TRACTOR OR WORKING MACHINE

[75] Inventors: Rauno Bergius; Risto Rautjärvi, both of Jyväskylä; Matti Kemppi, Vaajakoski; Alpo Toivola, Jyväskylä, all of Finland

[73] Assignee: Valmet Oy, Finland

[21] Appl. No.: 734,271

[22] PCT Filed: Oct. 3, 1984

[86] PCT No.: PCT/FI84/00071

§ 371 Date: May 13, 1984

§ 102(e) Date: May 13, 1984

[87] PCT Pub. No.: WO85/01702

PCT Pub. Date: Apr. 25, 1985

[30] Foreign Application Priority Data

Oct. 7, 1983 [FI] Finland ............................... 833661

[51] Int. Cl.$^4$ .................................................. B60G 9/02
[52] U.S. Cl. ...................................... 180/139; 180/41; 180/134; 280/6 R; 280/6 H; 280/111; 280/772
[58] Field of Search ............... 180/139, 132, 134, 135, 180/136, 137, 908, 41, 79.1; 280/6 R, 6 H, 6.1, 6.11, 111, 755, 702, 772; 414/702

[56] References Cited

U.S. PATENT DOCUMENTS

| | | | |
|---|---|---|---|
| 3,171,556 | 3/1965 | Brekelbaum et al. | 414/702 |
| 3,370,730 | 2/1968 | Fielding | 280/111 X |
| 3,397,752 | 8/1968 | Salna | 280/111 X |
| 3,572,746 | 3/1971 | Mueller | 280/6 H X |
| 3,687,227 | 8/1972 | Reuter et al. | 180/141 |
| 3,805,908 | 4/1974 | Thompson | 280/111 X |
| 3,976,302 | 8/1976 | Hammarstrand | 280/6 H |
| 4,093,248 | 6/1978 | Gassner et al. | 180/41 X |
| 4,512,589 | 4/1985 | Ambrose et al. | 280/6 R |
| 4,580,797 | 4/1986 | Ericsson | 280/6 H |

FOREIGN PATENT DOCUMENTS

| | | | |
|---|---|---|---|
| 309008 | 3/1969 | Sweden . | |
| 366500 | 4/1974 | Sweden . | |
| 435357 | 4/1982 | Sweden . | |
| 708870 | 5/1954 | United Kingdom | 280/111 |
| 1470500 | 4/1977 | United Kingdom . | |

Primary Examiner—John J. Love
Assistant Examiner—Mitchell J. Hill
Attorney, Agent, or Firm—Steinberg & Raskin

[57] ABSTRACT

An improvement in a working vehicle, such as a tractor, which includes a first frame part to which a steering wheel axle is coupled and a second frame part to which a second wheel axle is coupled with the frame part being pivotally interconnected to allow steering of the vehicle and wherein one of the wheel axles is swivelly mounted to its respective frame part to rock about a substantially horizontal axis so that one end of the rocking wheel axle is elevated when the vehicle is driven over uneven terrain. The improvement comprises bracing apparatus including at least two piston-cylinders, at least one of which is coupled to the frame part to which the rocking wheel axle is coupled and to the rocking wheel axle on one side of the frame part, the other piston-cylinder being coupled to the frame part and to the rocking wheel axle on the other side of the frame part, and a system for actuating only the piston-cylinder that is coupled to the side of the rocking wheel axle which is on the steering direction side to counteract the elevation only of that end of the rocking wheel axle on the steering direction side to which the steering wheel axle is turned.

5 Claims, 4 Drawing Figures

MEANS FOR IMPROVING THE STABILITY OF A TRACTOR OR WORKING MACHINE

BACKGROUND OF THE INVENTION

The present invention concerns a means for improving the stability of a tractor or other working machine in which a swivelling joint with horizontal axis has been connected to the body structure of the tractor or in conjunction with the wheel axles, this joint enabling the tractor's wheel axis to twist relative to each other when driving over rough terrain, and said tractor being provided with a work implement projecting beyond its frame, such as a loader and/or an excavator, which when loaded produces a moment tending to overturn the tractor when the tractor wheels are in a position turned to one side to for the purpose of steering.

For moving about in uneven terrain, the tractor and the work implement have as a rule been provided with some kind of swivelling joint which allows the tractor's wheel axles to twist with reference to each other. The structure cannot be made rigid since every tractor wheel must be able separately to conform to the terrain configuration, for instance to its dips and eminences. The swivelling axle may be disposed in the body of the tractor, or the axle of the tractor wheels may be designed to be a rocking axle.

Since to the body of the tractor large-sized work implements are often attached, such as loaders or excavators, the centre of gravity of the whole tractor tends to be quite high above the ground. Hereby, in some situations the stability of the tractor is impaired to the extent that the tractor may turn over. A situation like this is for instance incurred when the loader of the tractor is heavily loaded and simultaneously an abrupt turn to one side is executed with the tractor. Even an unloaded tractor may topple in an abrupt turn if the terrain is rough.

The stability problem is very serious in a body-steered tractor or working machine having a steering joint with vertical axis for moving the different parts of the tractor body with reference to each other. When a swivelling motion is induced about this joint, the axles attached to the parts of the body turn with them and in this way the tractor can be steered in the lateral direction. However, for moving over uneven terrain, a swivelling axle with horizontal axis has also been provided in the tractor, enabling the tractor's axles to twist with reference to each other, conforming to the configuration of the terrain. However, the swivelling axle renders the tractor exceedingly unstable in lateral direction. Large-sized work implements such as loaders may, when turned to one side, quite easily overturn a tractor of this kind.

In prior attempts to solve the above-mentioned tractor stability problem, for instance, the swivelling joint is not kept locked during normal driving in the terrain, and only when lifting a heavy load the swivelling axle is braced to be unturntable. However, such use of the tractor is inconvenient, and the driver is required to exercise great attentiveness so that he might always remember to carry out the required bracing measures. This procedure is still no guarantee that the tractor will never topple, because even an unloaded tractor may overturn in uneven terrain.

SUMMARY OF THE INVENTION

The object of the present invention is to eliminate the drawbacks mentioned and to provide a means which is substantially more advantageous in use than any means known in the prior art, for improving the stability of a tractor or working machine. The means is characterized in that in the frame of the tractor has been established a bracing member which counteracts the rotation of the swivelling joint when the tractor wheels are in a position turned to one side, for the purpose of steering.

According to an advantageous embodiment, the means has been attached to a body-steered tractor, in the body of which a joint with vertical axis for steering the tractor has been incorporated, in such manner that the different parts of the body and the axles thereto attached turn with reference to each other. As taught by the invention, a bracing member established in the frame of the tractor counteracts the rotation about the swivelling joint when the steering joint is in a sidewise turned position for steering the tractor.

According to another advantageous embodiment, the means has been attached to a body-steered tractor in which the swivelling joint which allows twisting of the tractor wheels with reference to each other is a rocking joint which joins the rocking axle of the tractor wheels to the body of the tractor, and said tractor being provided with a work implement protruding from the body, such as a loader or an excavator, mounted on that end of the tractor which carries the rocking axle. As taught by the invention, the means improving the stability of the tractor is a supporting member which resists the turning of the rocking axle when the steering joint of the body is in a position turned to one side.

As taught by one more advantageous embodiment, the supporting member improving the stability of the tractor comprises, disposed between the tractor body and the rocking axle, at least one hydraulic bracing cylinder which is hydraulically connected in parallel with the hydraulic lifting cylinder of the loader, whereby the operating force of the hydraulic cylinder resisting the turning of the rocking axis is directly proportional to the lifting force of the lifting cylinder of the loader.

DESCRIPTION OF THE DRAWINGS

The invention is described in the following by the aid of an example, referring to the drawings attached, wherein.

DESCRIPTION OF THE PREFERRED EMBODIMENTS

Figure 1:
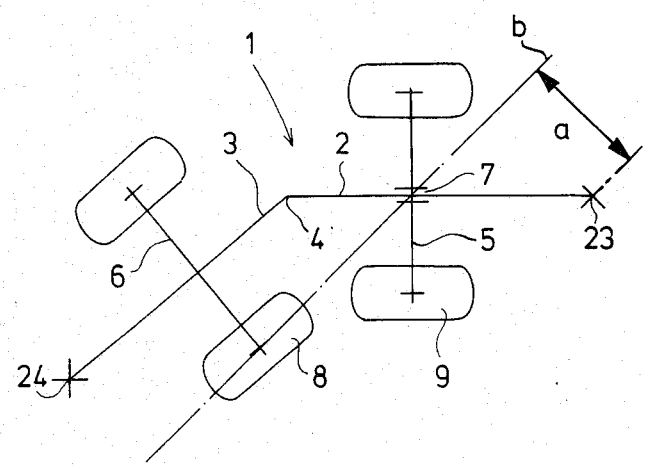
FIG. 1 presents schematically the state of equilibrium of a body-steered tractor.

In FIG. 1, a body-steered tractor 1 is presented schematically in top view. The parts 2 and 3 of the body of the tractor have been connected to each other by a steering joint 4 with vertical axis. When the different parts 2 and 3 of the body are turned at the steering joint, the axles 5 and 6 of the tractor also turn with reference to each other, thus enabling the tractor to be steered. Owing to uneven terrain, the axles 5 and 6 must however also swivel with reference to each other about a swivelling joint with horizontal axis. There are several alternatives in the placement of this joint in the body of the tractor. In FIG. 1, the turning of the axles 5 and 6 with reference to each other has been so arranged that the axle 5 comprises a rocking axle. The rocking joint 7 then constitutes the required swivelling joint. In addition, on each end of the tractor of FIG. 1 have been attached work implements, of which the means 23 located in the body part 2 adjacent to the rocking axle 5 is for instance a loader, and the means 24 located in the other body part 3 is for instance an excavator. In the position depicted in FIG. 1, in which the body parts 2 and 3 have swivlled around the steering joint 4 with reference to one another, an unfavourable situation is created as regards the equilibrium of the tractor. The load carried by the loader 23 is so strongly offset to one side of the tractor that a moment tending to overturn the tractor is produced. The figure reveals that the points of support preventing toppling, on the side of the load 23, are the rocking joint 7 and the closest wheel 8 on the opposite body part 3. The distance a of the load 23 from the straight line b passing through these points of support is directy proportional to the moment tending to overturn the tractor. The moment arm a has a considerable magnitude in this instance, and if the load 23 is also great the tractor will be sure to overturn.

Figure 2:
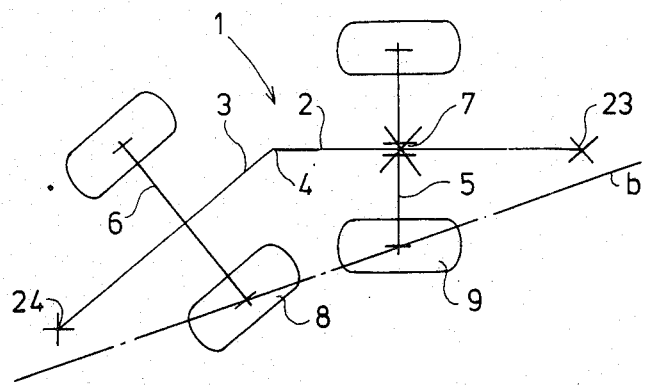
FIG. 2 corresponds to the state of equilibrium depicted in FIG. 1 when the body-steered tractor has been provided with the means of the invention.

In FIG. 2, the tractor of FIG. 1 is shown schematically in a similar situation, though with the difference that the rocking joint 7 has been braced against the body 2 in accordance with the invention. The straight line b passing through the points of support now shifts to pass through the wheels 8 and 9. Furthermore, the load 23 moves to the other side of said line b, whereby no moment arm tending to overturn the tractor is produced, and consequently no moment which would tend to topple the tractor exists.

Figure 3:
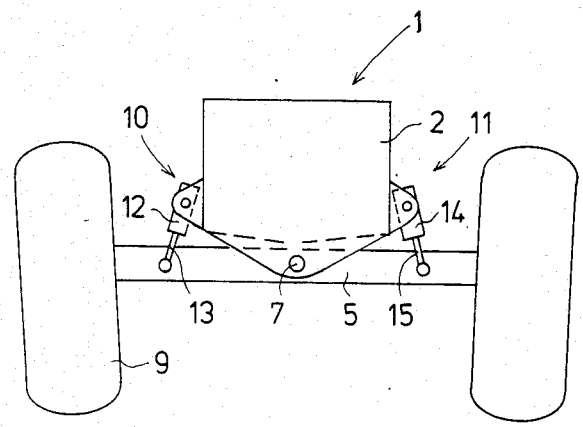
FIG. 3 presents in front view the rocking axle of the body-steered tractor, to which bracing cylinders according to the invention have been connected.

In FIG. 3 is depicted one body part 2 of the body-steered tractor 1 and the rocking axle 5 connected thereto by the rocking joint 7, in end view. Locking the rocking axle in place is accomplished with bracing members 10 and 11, which are hydraulic cylinders 12 and 14. As taught by the invention, the hydraulic cylinders 12 and 14 are so controlled that the pressure of the hydraulic fluid is always conducted to the hydraulic cylinder on the side in the direction of which the tractor has been turned by the steering joint, that is, in the direction in which the tractor or working machine tends to overturn.

Figure 4:
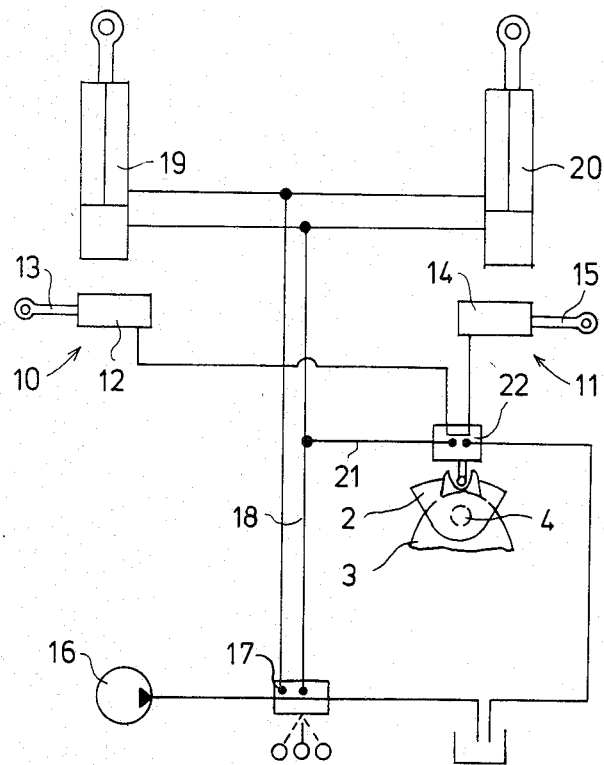
FIG. 4 shows the hydraulic circuit diagram of the means of the invention.

In FIG. 4 is shown the circuit diagram of the hydraulic system of the means of the invention. In this embodiment, the bracing members 10 and 11 of the invention are hydraulic cylinders 12 and 14 which have been attached to the body 2 of the tractor, as shown in FIG. 3. The pistons 13 and 15 of the hydraulic cylinders have been connected to the rocking axle 5. Pressurized hydraulic fluid to said cylinders 14 and 15 is obtained from the hydraulic circuit of the loader. The hydraulic fluid supplied by the pump 16 is conducted through the loader-controlling valve 17 by hydraulic tubing 18 to the lifting cylinders 19 and 20. From the same tube 18, the hydraulic fluid is carried by the tube 21 to a valve 22 controlled by the steering joint 4. This valve has been arranged to act in such manner that when the body parts 2 and 3 rotate with reference to each other around the steering joint 4, the valve 22 directs the fluid flow to one or the other bracing cylinder 12 or 14, depending on in which direction the tractor has been turned. The diagram in FIG. 4 shows that the pressurized hydraulic fluid must always be conducted to the bracing cylinder on that side on which the load is located.

In this manner, the bracing cylinder counteracts the tendency of the load-side end of the rocking axle to move upwards, thereby preventing the tractor from overturning. The hydraulic circuit diagram of FIG. 4 shows the lifting cylinders 19 and 20 and the bracing cylinders 12 and 14 have been connected in parallel, whereby, when the pressure increases in the lifting cylinder, it also similarly increases in the bracing cylinder. This has the consequence that the greater the load that is lifted by means of the lifting cylinders, the higher is the force by which the bracing cylinder counteracts the turning of the rocking axle about the rocking joint. Therefore, the operation of the bracing cylinders will be automatically controlled in accordance with the degree of loading of the loader's lifting cylinders.

It is obvious to a person skilled in the art that different embodiments of the invention may vary within the scope of the claims presented below. For instance, the supporting arrangement of the invention may also be applied when a rotational joint disposed in the body instead of a rocking axle is concerned.

Similarly, the system may be used if the working machine is not body-steered and, instead, the work implement is swivellable with reference to the body. Instead of two single-action bracing cylinders, one double-acting hydraulic cylinder may of course be used. Instead of a plurality of bracing cylinders coming into action as the steering angle increases, it is also possible to apply a system in which the pressure of the hydraulic fluid entering the hydraulic cylinder is controlled as a function of the steering angle.

We claim:

1. In a working vehicle including a frame assembly including first and second frame parts, a steering wheel axle coupled to said first frame part, a second wheel axle coupled to said second frame part, one of said wheel axles comprising a rocking wheel axle which is swivelably coupled by swivelling means to its respective frame part about a substantially horizontal axis to elevate one end of said rocking wheel axle when the vehicle is driven over uneven terrain, a steering joint pivotally interconnecting said first and second frame parts around a substantially vertical axis so that said first frame part is pivotable to either one of two steering direction sides for steering the vehicle, a work implement coupled to said frame assembly and projecting therefrom, said work implement when loaded producing a moment which tends to overturn the vehicle when said steering wheel axle is turned to one side for steering, and work implement actuating means coupled to said work implement and frame assembly for applying an actuating force to said work implement to operate said work implement, the improvement comprising:

bracing means coupled to said frame assembly, operable only when said steering wheel axis is turned to one steering direction side and only when said work implement actuating means applies an actuating force to said implement, for applying a bracing force which resists swivelling of said rocking wheel axle to counteract the elevation only of the end thereof on the steering direction side to which said steering wheel axle is turned, said bracing means including at least two bracing piston-cylinder means, at least one bracing piston-cylinder means being coupled to said respective frame part to which said rocking wheel axle is coupled and to said rocking wheel axle on one side of said swivelling means, and at least one bracing piston-cylinder means being coupled to said respective frame part and to said rocking wheel axle on the other side of said swivelling means, and means for actuating only said bracing piston-cylinder means coupled to the side of said rocking wheel axle which is on said steering direction side.

2. The combination of claim 1 wherein said swivelling means comprises a rocking joint swivelably coupling said rocking wheel axle to said first frame part, and wherein said work implement is coupled to said first frame part.

3. The combination of claim 2 wherein said work implement actuating means comprises work implement actuating hydraulic piston-cylinder means and wherein said bracing piston-cylinder means are connected in a hydraulic system in parallel with said work implement actuating hydraulic piston-cylinder means, whereby said bracing force applied by said bracing piston-cylinder means to said rocking wheel axle is directly proportional to said actuating force applied by said actuating hydraulic piston-cylinder means to said work implement.

4. The combination of claim 3 wherein said hydraulic system includes distribution valve means coupled to said steering joint for controlling operation of said bracing piston-cylinder means so that only said bracing piston-cylinder means on the steering direction side of said rocking joint applies a force to said rocking wheel axle to thereby counteract elevation of only the end of said rocking wheel axle on the steering direction side to which said steering wheel axle is turned.

5. The combination of claim 4 wherein said steering wheel axle and rocking wheel axle are the same wheel axle.

* * * * *